(12) United States Patent
Olsson (10) Patent No.: US 11,628,727 B2
(45) Date of Patent: Apr. 18, 2023

(54) HYBRID VEHICULAR WORK MACHINE

(71) Applicant: HUSQVARNA AB, Huskvarna (SE)

(72) Inventor: Tommy Olsson, Lerum (SE)

(73) Assignee: HUSQVARNA AB, Huskvarna (SE)

( * ) Notice: Subject to any disclaimer, the term of this patent is extended or adjusted under 35 U.S.C. 154(b) by 143 days.

(21) Appl. No.: 16/969,250

(22) PCT Filed: Feb. 21, 2019

(86) PCT No.: PCT/SE2019/050158
§ 371 (c)(1),
(2) Date: Aug. 12, 2020

(87) PCT Pub. No.: WO2019/164440
PCT Pub. Date: Aug. 29, 2019

(65) Prior Publication Data
US 2021/0001726 A1    Jan. 7, 2021

(30) Foreign Application Priority Data
Feb. 26, 2018 (SE) ................... 1850218-7

(51) Int. Cl.
*H02P 1/54* (2006.01)
*H02P 5/00* (2016.01)
(Continued)

(52) U.S. Cl.
CPC ............. *B60L 1/003* (2013.01); *B60L 3/0046* (2013.01); *B60L 50/53* (2019.02);
(Continued)

(58) Field of Classification Search
CPC ......... B60L 1/003; B60L 50/53; B60L 3/0046
(Continued)

(56) References Cited

U.S. PATENT DOCUMENTS

2009/0055061 A1* 2/2009 Zhu .................. F16H 47/04
903/910
2010/0099532 A1 4/2010 Cashen
(Continued)

FOREIGN PATENT DOCUMENTS

EP   2738035 A1   6/2014
EP   2810809 A1   12/2014
(Continued)

OTHER PUBLICATIONS

Swedish Office Action and Search Report for Swedish Application No. 1850218-7, dated Sep. 11, 2018.
(Continued)

*Primary Examiner* — Erick D Glass
(74) *Attorney, Agent, or Firm* — Burr & Forman LLP (57) ABSTRACT

The present disclosure relates to a vehicular work machine (10) comprising a first electric motor arrangement (31) comprising one or more electric motors (21, 21'), and a second electric motor arrangement (32) comprising one or more electric motors (22, 22') separate from said one or more electric motors (21, 21') of the first electric motor arrangement (31). The vehicular work machine (10) further comprises a power connection (8) adapted to be connected to an external electric power source (17), an energy storage arrangement (23) and a hydraulic pump assembly (24) that is adapted to power hydraulic devices (5, 18, 19, 20) comprised in the vehicular work machine (10). At least one electric motor (21, 21'; 22, 22') in each electric motor arrangement (31, 32) is adapted to propel the hydraulic pump assembly (24). Said one or more electric motors (21, 21') in the first electric motor arrangement (31) are arranged to be electrically powered from the external power supply (17), and said one or more electric motors (22, 22) in the second electric motor arrangement (32) are arranged to be (Continued)

electrically powered from the energy storage arrangement (23).

17 Claims, 5 Drawing Sheets

(51) Int. Cl.
    *B60L 1/00*           (2006.01)
    *B60L 50/53*        (2019.01)
    *B60L 3/00*          (2019.01)
    *E21B 7/02*          (2006.01)

(52) U.S. Cl.
    CPC ..... *B60L 2200/40* (2013.01); *B60L 2240/547* (2013.01); *E21B 7/025* (2013.01)

(58) Field of Classification Search
    USPC .......................................................... 318/34
    See application file for complete search history.

(56) References Cited

U.S. PATENT DOCUMENTS

| | | |
|---|---|---|
| 2013/0228377 A1 | 9/2013 | Kuittinen et al. |
| 2018/0154773 A1* | 6/2018 | Dalum ................... B60K 17/28 |

FOREIGN PATENT DOCUMENTS

| | | | |
|---|---|---|---|
| EP | 3037297 A1 | 6/2016 | |
| EP | 3813220 A1 * | 4/2021 | ............. B60L 1/003 |
| WO | 2013162448 A1 | 10/2013 | |

OTHER PUBLICATIONS

International Search Report and Written Opinion for International Application No. PCT/SE2019/050158 dated May 21, 2019.
Swedish Office Action and Search Report for Swedish Application No. 1951175-7, dated Apr. 15, 2020.

* cited by examiner

HYBRID VEHICULAR WORK MACHINE

TECHNICAL FIELD

This present disclosure relates to a vehicular work machine comprising a first electric motor arrangement with one or more electric motors, a second electric motor arrangement with one or more electric motors. The vehicular work machine further comprises a power connection adapted to be connected to an external electric power source, an energy storage arrangement and a hydraulic pump assembly that is adapted to power hydraulic devices.

BACKGROUND

Machines referred to as demolition robots are remote-controlled working machines intended for different demolition operations, in which the operator walks beside the machine and controls its different movements. The operator does this using a remote control that has two control sticks and a series of different buttons and knobs. The machine is used in several different working modes. It is first moved up to the working surface, e.g. a wall, to be demolished. Its support legs are then lowered so that the machine stands steady. The actual demolition work then begins.

A demolition robot can be powered by electricity and then is supplied with power through a power cable from a fixed electrical grid. The electrical energy is converted to hydraulic energy with the aid of an electrically driven pump device, which hydraulic energy in the form of a hydraulic medium under pressure is led to the various active units of the work machine via valves. The electric motor that is used to drive the pump device of the work machine is typically of three-phase, low-voltage type, with a rated voltage of 380-500 V and a frequency of 50 or 60 Hz.

For work machines, it has been proposed to use a battery, either alone or as a complement to the fixed electrical grid for work machines.

In EP 2738035 there is a mining vehicle with one electric motor for running a hydraulic pump and another electric motor for moving the mining vehicle. Each one of the motors can be energized by means of an external electric power network or a battery power source, and when the electric power supply to the electric motors is only provided from the external electric power network, the battery power source can be charged.

However, charging a battery from a three-phase electric power network requires corresponding charging equipment that is expensive, and normally needs to be connected to neutral. Only using one phase for charging, using a traditional charger, is insufficient for many normal situations.

It is therefore desired to provide an electric work machine that is equipped for connection to both an external power supply such as a power network and an internal power source such as a battery, where sufficient operation is maintained for normal work situations independently of which power source that is used and where a separate battery charger is not needed.

SUMMARY

The object of the present disclosure relates to providing an electric work machine that is equipped for connection to both an external power supply such as a power network and an internal power source such as a battery, where sufficient operation is maintained for normal work situations independently of which power source that is used.

This object is obtained by means of a vehicular work machine comprising a first electric motor arrangement comprising one or more electric motors, and a second electric motor arrangement comprising one or more electric motors separate from said one or more electric motors of the first electric motor arrangement. The vehicular work machine further comprises a power connection adapted to be connected to an external electric power source, an energy storage arrangement and a hydraulic pump assembly that is adapted to power hydraulic devices comprised in the vehicular work machine. At least one electric motor in each electric motor arrangement is adapted to propel the hydraulic pump assembly. Said one or more electric motors in the first electric motor arrangement are arranged to be electrically powered from the external power supply, and said one or more electric motors in the second electric motor arrangement are arranged to be electrically powered from the energy storage arrangement.

This confers an advantage of enabling differentiated power sources for electric motors driving a common hydraulic pump assembly in the vehicular work machine. In this way, a sufficient operation can be maintained for normal work situations independently of which power source that is used, enabling a versatile use of the vehicular work machine.

According to some aspects, the vehicular work machine is adapted for a charging mode of operation where the first electric motor arrangement is adapted to propel the second electric motor arrangement and to run the second electric motor arrangement as a generator that is adapted to charge the energy storage arrangement.

This confers an advantage of avoiding the need for a separate charger.

According to some aspects, in the charging mode of operation the first electric motor arrangement also propels the hydraulic pump assembly.

This confers an advantage of being able to operate the vehicular work machine during charging.

According to some aspects, the energy storage arrangement is connected to the second electric motor arrangement via a motor driver assembly that is adapted to convert the voltage provided by energy storage arrangement to a suitable voltage for the second electric motor arrangement. For example, the motor driver assembly is adapted to control a rate of power supplied from the energy storage arrangement in dependence of available power from the external power supply and power required by the hydraulic pump assembly.

This confers an advantage of using available power in an efficient manner.

According to some aspects, the motor driver assembly is adapted to work as a charger in the charging mode.

This confers an advantage of using one component for different purposes.

According to some aspects, the first motor driver assembly is adapted to control a rate of charging of the energy storage arrangement in dependence of available power from the external power supply and power required by the hydraulic pump assembly.

This confers an advantage of charging the energy storage arrangement in an efficient manner.

According to some aspects, the vehicular work machine is adapted for

A first mode of operation where only the first electric motor arrangement propels the hydraulic pump assembly.

A second mode of operation where only the second electric motor arrangement propels the hydraulic pump assembly.

A third mode of operation where both electric motor arrangements propel the hydraulic pump assembly.

This confers an advantage of having a versatile propulsion of the hydraulic pump assembly, such that the electric motor arrangements are used in an efficient manner.

According to some aspects, the third mode of operation comprises at least one of the following sub-modes of operation:

A starting mode, where the second electric motor arrangement is adapted to run the first electric motor arrangement before it is powered from the external electric power source.

A common driving mode, where both electric motor arrangements are adapted to propel the hydraulic pump assembly.

This confers an advantage of enabling an uncomplicated and reliable soft start of the second electric motor arrangement.

According to some aspects, the vehicular work machine comprises a single-phase battery charger that is connectable to the external electric power source via a charger contactor.

This confers an advantage of enabling auxiliary charging in an inexpensive manner.

There are also disclosed herein methods associated with the above-mentioned advantages.

Other examples are disclosed in the dependent claims.

BRIEF DESCRIPTION OF DRAWINGS

The present disclosure will now be described more in detail with reference to the accompanying figures wherein.

DETAILED DESCRIPTION

Figure 1:
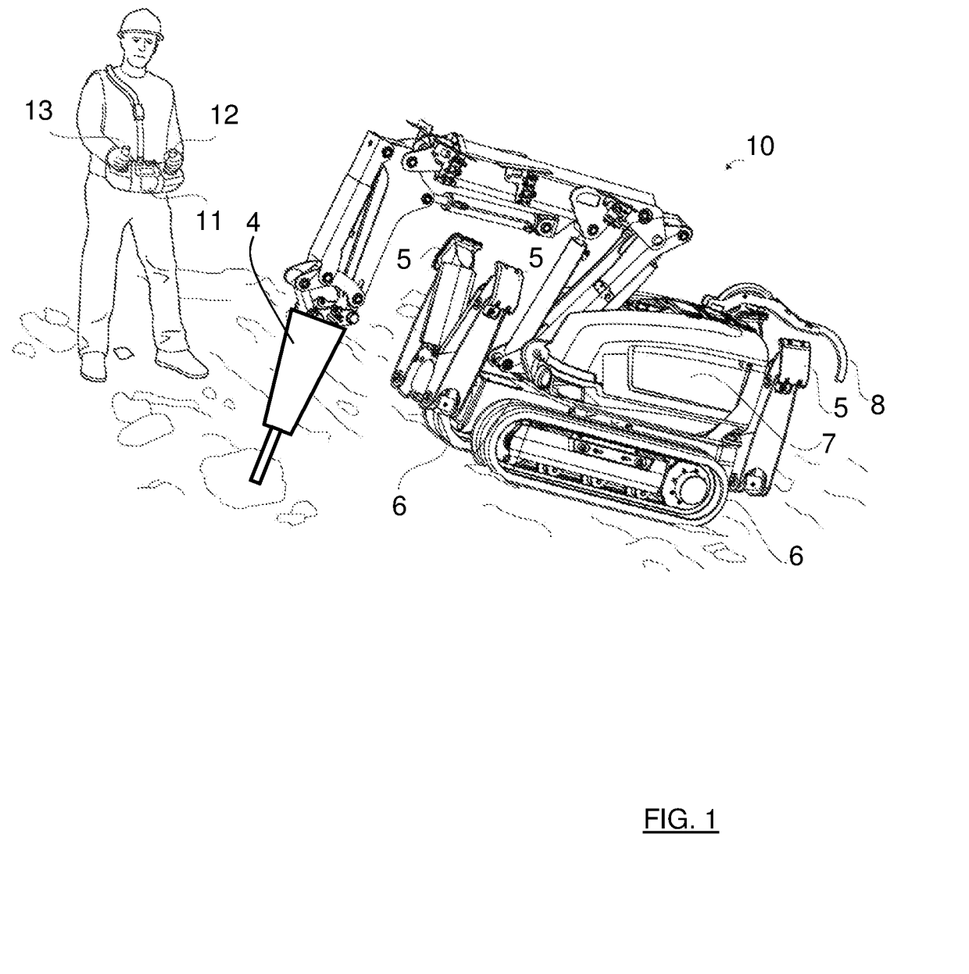
FIG. 1 shows a first view of a demolition robot and a remote control.

With reference to FIG. 1, there is a working machine 10 in the form of a demolition robot which is electrically driven and which has a power connection 8. In the figures, the connection 8 is shown in a detached state, but it is during operation connected to a cable leading to an external electric power source 17 (schematically indicated in FIG. 1), generally for three-phase current. The machine is driven by caterpillar tracks 6 and has a rotating tower 7. An arm consisting of several parts is secured to the tower 7.

The machine has four support legs 5 which here are shown fully raised. The operator operates the machine with the aid of a remote control 11 which is in this case worn over the operator's shoulders. However, it may of course also be secured in a different manner, e.g. by means of a waist belt. The remote control has a left control stick 12 and a right control stick 13.

Figure 2:
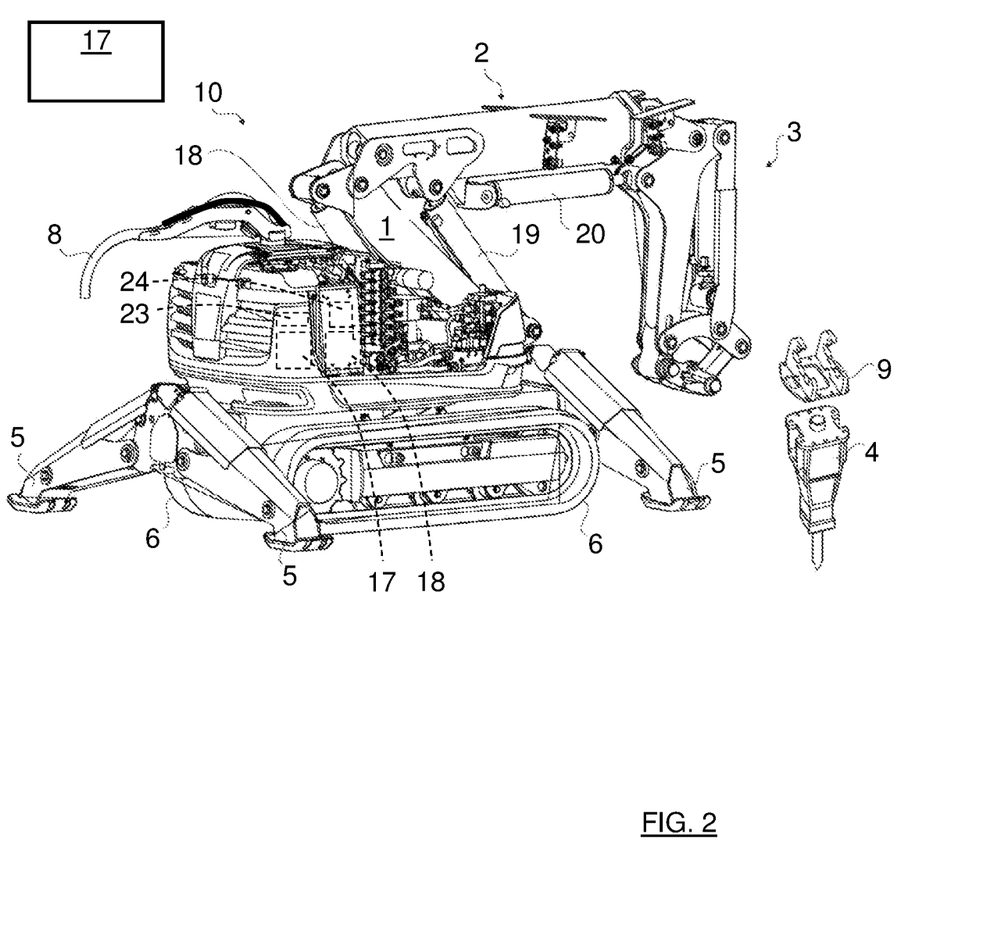
FIG. 2 shows a second view of the demolition robot.

FIG. 2 shows the demolition robot 10 in more detail with some of the protective casings removed. Its support legs 5 are lowered so that the machine rests steady on its four support legs. As mentioned, the machine has an arm consisting of three parts. A first arm 1 is hinged to the rotating tower 7 of the machine and can be swung with the aid of a first hydraulic cylinder 18, the upper end of which is seen in the left part of the arm. A second arm 2 is secured to the first arm 1. It is inclined with the aid of a second hydraulic cylinder 19 on the front side of the first arm 1. The second arm 2 also has an inner telescopically extendable part which increases the range of the machine. It is operated by a hydraulic cylinder which is placed within the second arm 2 and is therefore completely concealed. A third arm 3 is secured to the outer end of the second arm 2, and is swung by a third hydraulic cylinder 20 on the inside of the second arm 2.

The outer end of the third arm 3 is designed in such a manner that it can be secured to a mounting plate 9 mounted on the rear side of a demolition tool 4. For the sake of clarity, the tool 4 and the mounting plate 9 are shown separated from one another and from the outer end of the third arm 3. In FIG. 1, a schematical breaker 4 for chipping concrete or the like, is shown mounted. It can be exchanged for a concrete crusher for breaking and cutting material.

Figure 3:
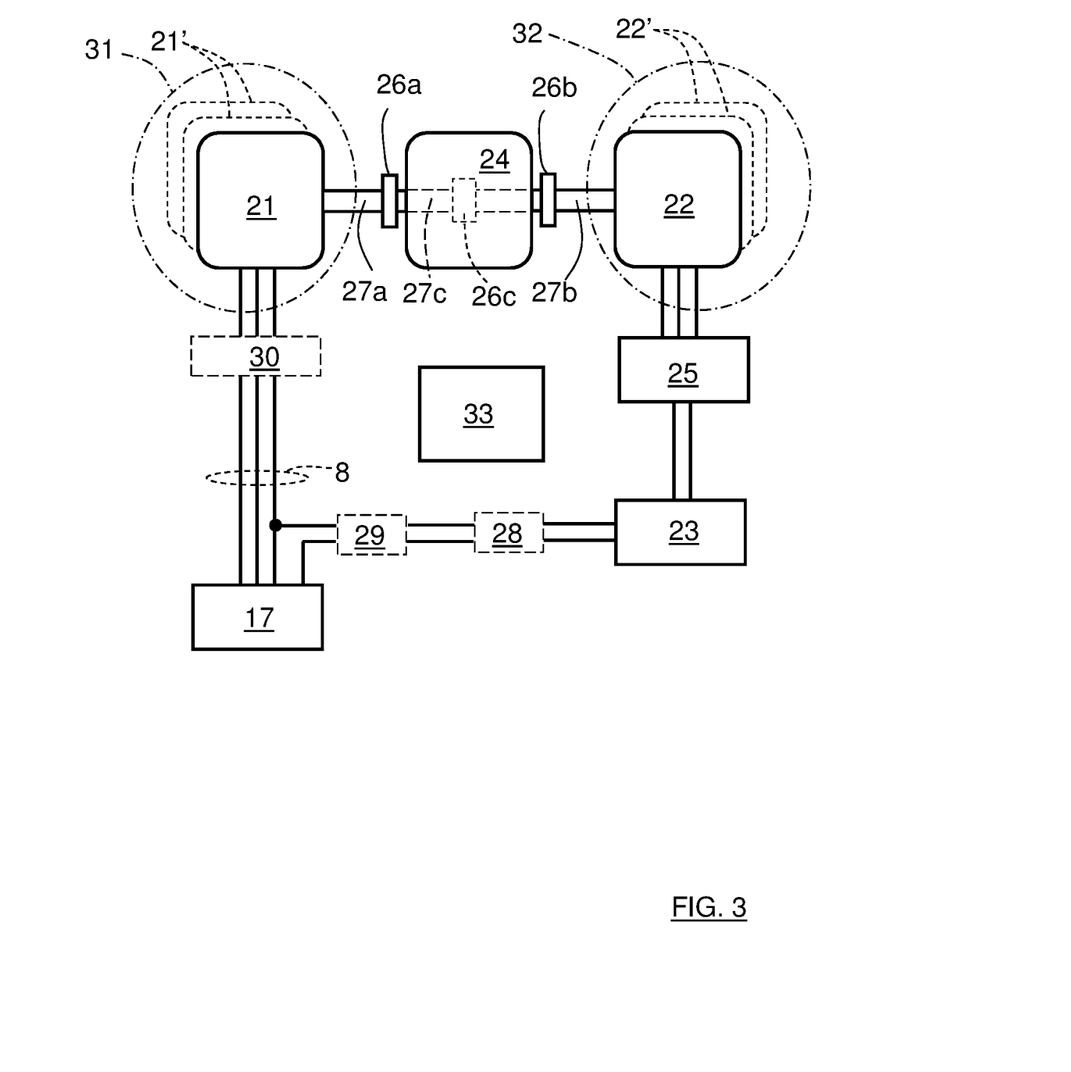
FIG. 3 shows a schematical view of components comprised in the demolition robot.

With reference also to FIG. 3, The demolition robot 10 comprises a first electric motor 21, a second electric motor 22, a battery 23 and a hydraulic pump assembly 24 that is adapted to power the hydraulic cylinders 18, 19, 20 and other hydraulic devices such as the support legs 5 and a propulsion unit for the caterpillar tracks 6 in a previously known manner.

According to the present disclosure, the first electric motor 21 is adapted to be powered only from the external electric power source 17 via the power cable and the second electric motor 22 adapted to be powered only from the battery 23. For that purpose, the battery 23 is connected to the second electric motor 22 via a motor driver assembly 25 that is adapted to convert the voltage provided by the battery 23 to a suitable voltage for the second motor arrangement 22.

Both electric motors 22 are connectable to the hydraulic pump assembly 24, according to some aspects via a first clutch arrangement 26a and a second clutch arrangement 26b. More in detail, the first electric motor 21 is connected to a first power transferring shaft 27a and the second electric motor 22 is connected to a second power transferring shaft 27b. The first power transferring shaft 27a is connectable to a third power transferring shaft 27c that is adapted to drive the hydraulic pump assembly 24 via the first clutch arrangement 26a, and the second transferring shaft 27b is connectable to the third power transferring shaft 27c via the second clutch arrangement 26b.

In a first mode of operation, the first clutch arrangement 26a is adapted to connect the first power transferring shaft 27a to the third power transferring shaft 27c and the second clutch arrangement 26b is adapted to disconnect the second transferring shaft 27b from the third power transferring shaft 27c. In the first mode of operation, only the first electric motor 21 is propelling the hydraulic pump assembly 24, the demolition robot 10 then only being powered by means of the external electric power source 17.

In a second mode of operation, the second clutch arrangement 26b is adapted to connect the second power transferring shaft 27b to the third power transferring shaft 27c and the second clutch arrangement 26b is adapted to disconnect the first transferring shaft 27a from the third power transferring shaft 27c. In the second mode of operation, only the second electric motor 22 is propelling the hydraulic pump assembly 24, the demolition robot 10 then only being powered by means of the battery 23.

In a third mode of operation, the first clutch arrangement 26a is adapted to connect the first power transferring shaft 27a to the third power transferring shaft 27c, and the second clutch arrangement 26b is adapted to connect the second power transferring shaft 27b to the third power transferring shaft 27c.

The third mode of operation, where the electric motors 21, 22 are mechanically connected to each other, comprises three different sub-modes of operation; a starting mode, a common driving mode and a charging mode.

In the starting mode, the second electric motor 22 is adapted to run the first electric motor 21 before it is powered from the external electric power source 17, enabling a soft start of the first electric motor 21 that minimizes current peaks during start of the first electric motor 21. After start-up, the first electric motor 21 is powered from the external electric power source 17. Then any mode of operation where the first electric motor 21 is running can follow.

In the common driving mode, both electric motors are adapted to propel the hydraulic pump assembly 24, conferring a maximum available working power to the demolition robot 10.

In the charging mode, the first electric motor 21 is adapted to run the second electric motor 22 as a generator. In this case, the motor driver assembly 25 works as a battery charger that can be controlled for charging the battery 23.

In the charging mode, according to some aspects, the third power transferring shaft 27c can either be connected for driving the hydraulic pump assembly 24 or disconnected from the hydraulic pump assembly 24. This is enabled by means of a third clutch arrangement 26c that is adapted to connect and disconnect the third power transferring shaft 27c to and from the hydraulic pump assembly 24.

In the former case, when the third power transferring shaft 27c is connected for driving the hydraulic pump assembly 24, the excess available power from the external electric power source 17, not being required by the hydraulic pump assembly 24, may be used for charging the battery 23 via the first electric motor 21. In this case, the motor driver assembly 25 is adapted to control a rate of charging of the battery 23 in dependence of available power from the external power source 17 and power required by the hydraulic pump assembly 24. If more power is required by the hydraulic pump assembly 24 than is available from the external power source 17, the motor driver assembly 25 is adapted to control a rate of power supplied from the battery 23 in dependence of the power needed.

In the latter case, when the third power transferring shaft 27c is disconnected from the hydraulic pump assembly 24, all available power from the external electric power source 17 can be used for charging the battery 23 via the first electric motor 21.

The electric motors 21, 22 are not sensitive for overvoltage or surge on the external electric power source 17, enabling a robust charging. The battery voltage system is isolated from the incoming 3-phase power from the external electric power source 17. By having two electric motors, the need for a separate three-phase charger is eliminated by using the second electric motor 22 as a generator and the driver assembly 25 as a battery charger. Instead of one larger electric motor, two smaller electric motors can be used. Motor sizes may be chosen in dependence of the power needed when running on battery power without grid connection.

According to some aspects, as indicted with dotted lines, a single-phase battery charger 28 is connected to the external electric power source 17 via a charger contactor 29. The single-phase battery charger 28 is of a common and inexpensive type and is used for charging the battery when a need arises. It should be noted that the efficiency of the battery charging during the charging mode exceeds the efficiency of the battery charging by means of the single-phase battery charger 28. The single-phase battery charger 28 can be used for overnight charging or for charging with lower power. This can automatically be connected when the first electric motor 21 is turned off, by means of the charger contactor 29.

According to some aspects, as indicted with dotted lines, in case the starting mode is not implemented, or not working, the first electric motor is conventionally started by means of a motor contactor 30. In this case, a conventional soft start arrangement is preferably used in order to reduce the magnitude of electric current during start.

The present disclosure is not limited to the examples above, but may vary freely within the scope of the appended claims. For example, the electric motors 21, 22 are connectable to the hydraulic pump assembly 24 via other arrangements than said clutch arrangements 26a, 26b.

The workings of the components described above for the demolition robot 10 are according to some aspects controlled by one or more control units 33, as schematically indicated in FIG. 3.

When the demolition robot 10 is in the form of a remote-controlled demolition robot it further comprises a radio module that is used for communicating with the remote control 11. It is also conceivable that a wired control is used, where such a wire may be connected through or along with the power connection 8.

Although the present disclosure has been described for a demolition robot 10 that is remotely controlled, the present disclosure is applicable for any type of vehicular work machine.

Generally, the demolition robot 10 comprises a first electric motor arrangement 31 comprising one or more electric motors 21, 21' as indicated schematically with dashed lines in FIG. 3, which in the case of two or more electric motors 21, 21' can be more or less mechanically interconnected. Generally, the demolition robot 10 further comprises a second electric motor arrangement 32 comprising one or more electric motors 22, 22' as indicated schematically with dashed lines in FIG. 3, which in the case of two or more electric motors 21, 21' can be more or less mechanically interconnected. Said one or more electric motors 21, 21' comprised in the first electric motor arrangement 31 are all arranged to be electrically powered from an external power supply only, such as a power grid 17, and said one or more electric motors 22, 22' comprised in the second electric motor arrangement 32 are all arranged to be electrically powered from a battery 23 only. Generally, the battery is constituted by an energy storage arrangement 23 of a suitable kind that is adapted to be charged.

The examples presented above are only disclosed for providing an understanding of the present disclosure. Generally, the third mode of operation, where the electric motors 21, 22 are mechanically connected to each other, comprises at least one of said sub-modes, the starting mode and the common driving mode. The inventive concept relies in the fact that one electric motor, or electric motor arrangement, is arranged to be electrically powered from an external power supply, such as a power grid, and another electric motor, or electric motor arrangement, is arranged to be electrically powered from an internal power source, where the internal power source may be chargeable and may hold a charged amount of electric energy, generally being constituted by an energy storage arrangement 23.

According to some aspects, one electric motor, or electric motor arrangement, is arranged to be electrically powered mainly from an external power supply, and another electric motor, or electric motor arrangement, is arranged to be electrically powered mainly from an internal power source. The internal power source is chargeable and can hold a charged amount of electric energy, generally being constituted by an energy storage arrangement 23.

In this context, the term powered refers to acquiring electric power for running one or more electric motors. According to some aspects, an electric motor can have electrical connections that for example are associated with sensors and control circuits at the electric motor in question. Such electrical connections are of a low-voltage type, normally about 5V, and are relaying electrical currents of relatively low magnitudes, and are not associated with powering an electrical motor.

The hydraulic pump assembly 24 can comprise one or more hydraulic pumps.

The supporting legs are optional, and the number of supporting legs may vary but should be at least two when present. Instead of supporting legs, dozer blades can be used.

The external electric power source is according to some aspects a one-phase powers source, two-phase power source or three-phase power source, in any case with or without a neutral and/or a ground connection.

The caterpillar tracks 6 are according to some aspects directly electrically driven.

Figure 4:
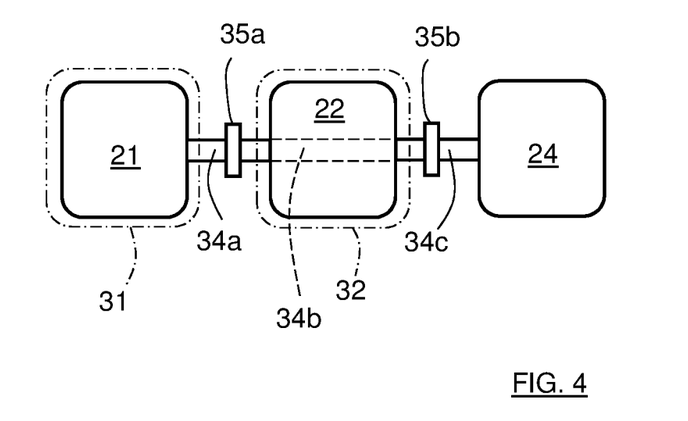
FIG. 4 shows a schematical view of an example of a motor configuration.

According to some aspects, the electric motors can be arranged in many different manners. In FIG. 4, only schematically showing how the electric motors are connected to the hydraulic pump assembly 24, there is a first electric motor 21 according to the example above and a second electric motor 22 according to the example above. This means that there is only one electric 21 motor in a first electric motor arrangement 31 and only one electric motor 22 in a second electric motor arrangement 32. Of course there can be any number of electric motors in the respective electric motor arrangement, here only an example showing a principle is disclosed.

The first electric motor 21 is connectable to the second electric motor 22 via a first power transferring shaft 34a, a first clutch arrangement 35a and a second power transferring shaft 34b. The second electric motor 22 is connectable to the hydraulic pump assembly 24 via the second power transferring shaft 34b, a second clutch arrangement 35b and a third power transferring shaft 34c. Here, the first clutch arrangement 35a is adapted to connect or disconnect a mechanical connection between the electric motors 21, 22, and the second clutch arrangement 35b is adapted to connect or disconnect a mechanical connection between the second electric motor 22 and the hydraulic pump assembly 24.

This means that the second electric motor 22 can be mechanically connected to the hydraulic pump assembly 24, with or without being mechanically connected to the first electric motor 21. The first electric motor 21 can be mechanically connected to the second electric motor 22 only, admitting charging of the battery 23 without propelling the hydraulic pump assembly 24, or mechanically connected to the hydraulic pump assembly 24 together with the second electric motor 22.

Figure 5:
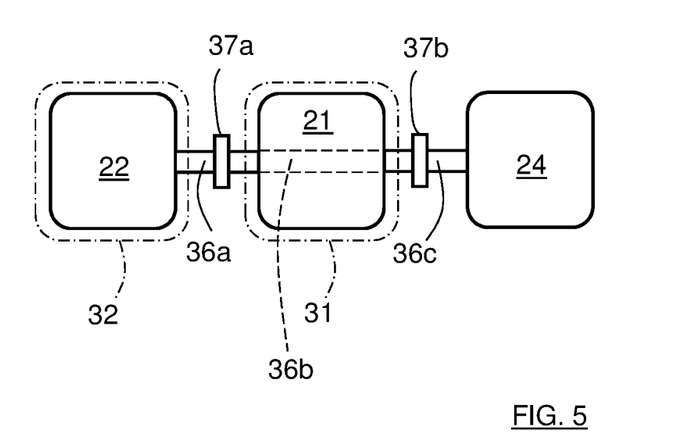
FIG. 5 shows a schematical view of another example of a motor configuration.

In FIG. 5, there is a similar arrangement, but here the first electric motor 21 and the second electric motor 22 have changed places. The second electric motor 22 is connectable to the first electric motor 21 via a first power transferring shaft 36a, a first clutch arrangement 37a and a second power transferring shaft 36b. The first electric motor 21 is connectable to the hydraulic pump assembly 24 via the second power transferring shaft 36b, a second clutch arrangement 37b and a third power transferring shaft 36c. Here, the first clutch arrangement 37a is adapted to connect or disconnect a mechanical connection between the electric motors 21, 22, and the second clutch arrangement 37b is adapted to connect or disconnect a mechanical connection between the first electric motor 21 and the hydraulic pump assembly 24.

This means that the first electric motor 21 can be mechanically connected to the hydraulic pump assembly 24, with or without being mechanically connected to the second electric motor 22. The second electric motor 22 can be mechanically connected to the first electric motor 21 only, admitting charging of the battery 23 without propelling the hydraulic pump assembly 24, or mechanically connected to the hydraulic pump assembly 24 together with the first electric motor 21.

Figure 6:
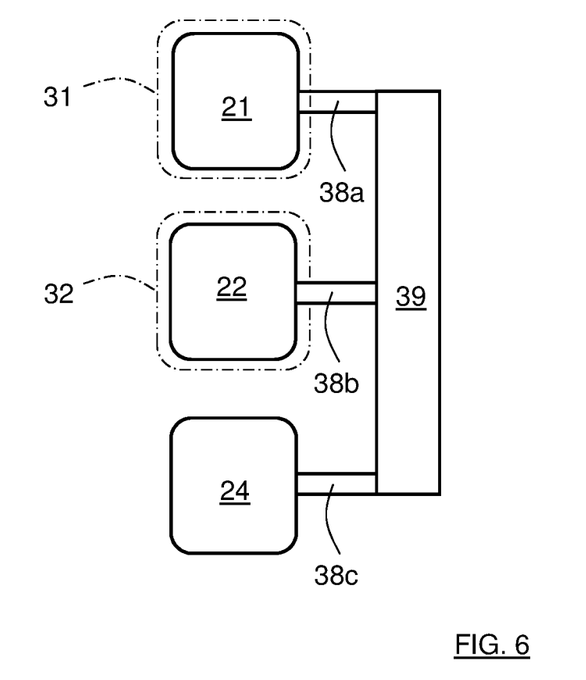
FIG. 6 shows a schematical view of yet another example of a motor configuration.

In FIG. 6, a parallel configuration is shown. Here the first electric motor 21 and the second electric motor 22 are mounted in parallel with respect to each other and the hydraulic pump assembly 24. More in detail, the first electric motor 21 is mechanically connected to a first power transferring shaft 38a, the second electric motor 22 is mechanically connected to a second power transferring shaft 38b and the hydraulic pump assembly 24 is mechanically connected to a third power transferring shaft 38c. These power transferring shafts 38a, 38b, 38c are connectable via a common clutch arrangement 39 that according to some aspects comprises a belt transmission.

This means that the first electric motor 21, the second electric motor 22 and the hydraulic pump assembly 24 are connectable to each other via the common clutch arrangement 39 that according to some aspects is adapted to mechanically connect the first electric motor 21, the second electric motor 22 and the hydraulic pump assembly 24 irrespective of each other.

The clutch arrangements 26a, 26b, 26c; 35a, 35b, 35c; 37a, 37b, 37c; 39 are generally constituted by power transferring arrangements. According to some aspects, each one of the power transferring arrangement 26a, 26b, 26c; 35a, 35b, 35c; 37a, 37b, 37c; 39 comprises at least one of a clutch assembly and a gear assembly. By means of a gear assembly, rotational speeds can be converted to suitable magnitudes.

According to some aspects, one or more power transferring arrangements 26a, 26b, 26c; 35a, 35b, 35c; 37a, 37b, 37c; 39 is/are omitted, such that two or more of the power transferring shafts 27a, 27b, 27c; 34a, 34b, 34c; 36a, 36b, 36c; 38a, 38b, 38c is/are constituted by one coherent power transferring shaft. This means that according to some aspects, according to one example, there are no power transferring arrangements 26a, 26b, 26c; 35a, 35b, 35c; 37a, 37b, 37c; 39 at all, and all electric motors 21, 22 and the hydraulic pump assembly 24 are always directly mechanically connected to each other.

Having power transferring arrangements 26a; 35a; 39 adapted for disengaging said one or more electric motors 21, 21' in the first electric motor arrangement 31 reduces the risk of driving one or more of said one or more electric motors 21, 21' in the first electric motor arrangement 31 backwards and provide an electric current into the external power source 17 if the motor contactor 30 would turn on. Without such power transferring arrangements 26a; 35a; 39, this can be avoiding by monitoring the motor contactor 30.

Having power transferring arrangements 26c; 35b; 37b; 39 adapted for disengaging the hydraulic pump assembly 24 reduces the risk of unpredictable movements. Without such power transferring arrangements 26c; 35b; 37b; 39, this can be avoided by monitoring the hydraulic pressure in the system.

Generally, due to different kinds of power transferring arrangements 26c; 35b; 37b; 39 and that one or more power transferring arrangements 26c; 35b; 37b; 39 as described is/are not used, one or more of the electric motor/motors is/are adapted to propel the hydraulic pump assembly 24, and the first electric motor arrangement 31 is adapted to propel the second electric motor arrangement 32.

Generally, this means that:
In the first mode of operation only the first electric motor arrangement 31 propels the hydraulic pump assembly 24,
In the second mode of operation only the second electric motor arrangement 32 propels the hydraulic pump assembly 24, and
in the third mode of operation both electric motor arrangements 31, 32 propel the hydraulic pump assembly 24.

Furthermore, generally, in the charging mode of operation, the first electric motor arrangement 31 propels the second electric motor arrangement 32. According to some aspects, in the charging mode of operation, the first electric motor arrangement 31 also propels the hydraulic pump assembly 24.

According to some aspects, the first electric motor arrangement 31 comprises one or more asynchronous electric motors 21, 21'. This is advantageous since an asynchronous motor is less expensive than a 3-phase battery charger with the same power, and normally also less expensive than many other types of electric motors. Furthermore, an asynchronous motor can be connected to a three-phase voltage without connection to an electric neutral. Most battery chargers require connection to neutral which is not available on all power supply networks.

Furthermore, an asynchronous motor is robust in its construction and is capable of being mounted in a demolition robot. A three-phase charger is usually adapted to be wall-hung or possibly sitting on a forklift truck, a much less harsh environment than in a demolition robot.

Furthermore, an asynchronous motor is easy to adapt to different voltages and frequencies in different markets. Since the selection of on-board chargers is very limited, it would according to an example be very difficult and costly to provide a charger each separate market (e.g. for Japan (2×200V), South Africa (3×525V) and Canada (3×575V)). But asynchronous motors with the right voltage are available for all markets, making adaptation of the demolition robot to match each present market is uncomplicated and cost effective.

According to some aspects, the first electric motor arrangement 31 comprises one or more electric motors 21, 21' of relatively large powers, with the possibility of limiting power output of the motor. For example, an electric motor rated for 32 A current can be limited to loading the external power supply with only 16 A if there is only a connection to 16 A available. If 32 A is available, the corresponding power can of course be used.

The more the first electric motor arrangement 31 may be loaded, the more the power output of the second electric motor arrangement 32 may be limited, which in turn will provide longer battery life. Because the batteries are a major part of the hybrid cost, having one or more electric motors 21, 21' of relatively large powers in the first electric motor arrangement 31, the lifetime of the relatively expensive battery can be extended.

According to some aspects, the motors in the electric motor arrangements 31, 32 can comprise asynchronous motors, synchronous motors, universal motors and/or permanent magnet motors.

Generally, the present disclosure relates to a vehicular work machine 10 comprising a first electric motor arrangement 31 comprising one or more electric motors 21, 21', and a second electric motor arrangement 32 comprising one or more electric motors 22, 22' separate from said one or more electric motors 21, 21' of the first electric motor arrangement 31, where the vehicular work machine 10 further comprises a power connection 8 adapted to be connected to an external electric power source 17, an energy storage arrangement 23 and a hydraulic pump assembly 24 that is adapted to power hydraulic devices 5, 18, 19, 20 comprised in the vehicular work machine 10, where at least one electric motor 21, 21'; 22, 22' in each electric motor arrangement 31, 32 is adapted to propel the hydraulic pump assembly 24. Said one or more electric motors 21, 21' in the first electric motor arrangement 31 are arranged to be electrically powered from the external power supply 17, and said one or more electric motors 22, 22' in the second electric motor arrangement 32 are arranged to be electrically powered from the energy storage arrangement 23.

According to some aspects, said one or more electric motors 21, 21' in the first electric motor arrangement 31 are arranged to be electrically powered mainly from the external power supply 17, and said one or more electric motors 22, 22' in the second electric motor arrangement 32 are arranged to be electrically powered mainly from the energy storage arrangement 23.

According to some aspects, the vehicular work machine 10 is adapted for a charging mode of operation where the first electric motor arrangement 31 is adapted to propel the second electric motor arrangement 32 and to run the second electric motor arrangement 32 as a generator that is adapted to charge the energy storage arrangement 23.

According to some aspects, the charging mode of operation, the first electric motor arrangement 31 also propels the hydraulic pump assembly 24.

According to some aspects, the energy storage arrangement 23 is connected to the second electric motor arrangement 32 via a motor driver assembly 25 that is adapted to convert the voltage provided by energy storage arrangement 23 to a suitable voltage for the second electric motor arrangement 32.

According to some aspects, the motor driver assembly 25 is adapted to control a rate of power supplied from the energy storage arrangement 23 in dependence of available power from the external power supply 17 and power required by the hydraulic pump assembly 24.

According to some aspects, the motor driver assembly 25 is adapted to work as a charger in the charging mode.

According to some aspects, the first motor driver assembly 25 is adapted to control a rate of charging of the energy storage arrangement 23 in dependence of available power from the external power supply 17 and power required by the hydraulic pump assembly 24.

According to some aspects, the vehicular work machine 10 is adapted for
a first mode of operation where only the first electric motor arrangement 31 propels the hydraulic pump assembly 24,
a second mode of operation where only the second electric motor arrangement 32 propels the hydraulic pump assembly 24, and a third mode of operation where both electric motor arrangements 31, 32 propel the hydraulic pump assembly 24.

According to some aspects, the third mode of operation comprises at least one of the following sub-modes of operation:

a starting mode, where the second electric motor arrangement 32 is adapted to run the first electric motor arrangement 31 before it is powered from the external electric power source 17;

a common driving mode, where both electric motor arrangements 31, 32 are adapted to propel the hydraulic pump assembly 24.

According to some aspects, the vehicular work machine 10 comprises a single-phase battery charger 28 that is connectable to the external electric power source 17 via a charger contactor 29.

According to some aspects, the first electric motor arrangement 31 comprises one or more asynchronous electric motors 21, 21'.

Figure 7:
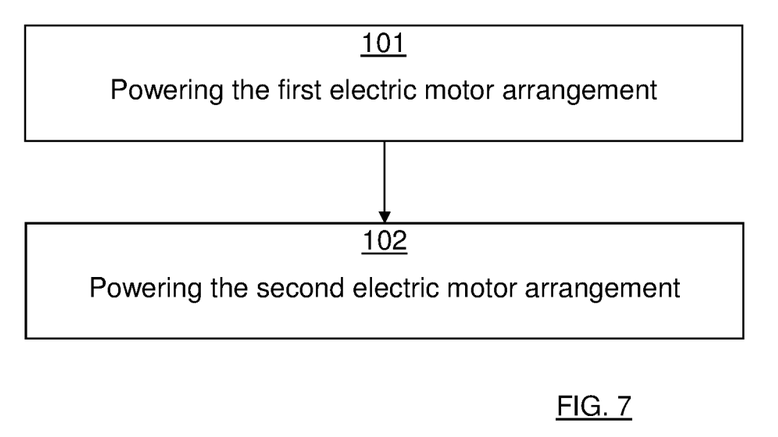
FIG. 7 shows a flowchart for a method according to the present disclosure.

Generally, with reference to FIG. 7, the present disclosure also relates to a method for a vehicular work machine 10, having an energy storage arrangement 23, a first electric motor arrangement 31 using one or more electric motors 21, 21', and a second electric motor arrangement 32 using one or more electric motors 22, 22'. The method comprises:

powering 101 the first electric motor arrangement 31 from an external electric power source 17; and powering 102 the second electric motor arrangement 32 from the energy storage arrangement 23.

According to some aspects, in a charging mode of operation, the first electric motor arrangement 31 is used for running the second electric motor arrangement 32 as a generator that is used for charging the energy storage arrangement 23.

According to some aspects, in a first mode of operation, the method comprises only using the first electric motor arrangement 31 for propelling a hydraulic pump assembly 24 used in the vehicular work machine 10, in a second mode of operation, the method comprises only using the second electric motor arrangement 32 for propelling the hydraulic pump assembly 24, and in a third mode of operation, using both electric motor arrangements 31, 32 for propelling the hydraulic pump assembly 24.

According to some aspects, the third mode of operation comprises at least one of the following sub-modes of operation:

a starting mode, where the second electric motor arrangement 32 is used for propelling the first electric motor arrangement 31 before it is powered from the external electric power source 17;

a common driving mode, where both electric motor arrangements 31, 32 are used for propelling the hydraulic pump assembly 24.

The invention claimed is:

1. A vehicular work machine comprising a first electric motor arrangement comprising one or more electric motors, and a second electric motor arrangement comprising one or more other electric motors, wherein the vehicular work machine further comprises a power connection adapted to be connected to an external electric power source, an energy storage arrangement and a hydraulic pump assembly that is adapted to power hydraulic devices comprised in the vehicular work machine, wherein at least one electric motor in each of the first and second electric motor arrangements is adapted to propel the hydraulic pump assembly, the one or more electric motors in the first electric motor arrangement and the one or more electric motors in the second electric motor arrangement are adapted to be mechanically connectable or mechanically connected to each other, and wherein said one or more electric motors in the first electric motor arrangement are arranged to be electrically powered from the external power supply, and said one or more other electric motors in the second electric motor arrangement are arranged to be electrically powered from the energy storage arrangement.

2. The vehicular work machine according to claim 1, wherein said one or more electric motors in the first electric motor arrangement are arranged to be electrically powered mainly from the external power supply, and said one or more other electric motors in the second electric motor arrangement are arranged to be electrically powered mainly from the energy storage arrangement.

3. The vehicular work machine according to claim 1, wherein the vehicular work machine is adapted for a charging mode of operation where the first electric motor arrangement is adapted to propel the second electric motor arrangement and to run the second electric motor arrangement as a generator that is adapted to charge the energy storage arrangement.

4. The vehicular work machine according to claim 3, wherein in the charging mode of operation, the first electric motor arrangement also propels the hydraulic pump assembly.

5. The vehicular work machine according to claim 4, wherein the energy storage arrangement is connected to the second electric motor arrangement via a motor driver assembly that is adapted to convert the voltage provided by energy storage arrangement to a suitable voltage for the second electric motor arrangement.

6. The vehicular work machine according to claim 5, wherein the motor driver assembly is adapted to control a rate of power supplied from the energy storage arrangement in dependence of available power from the external power supply and power required by the hydraulic pump assembly.

7. The vehicular work machine according to claim 5, wherein the motor driver assembly is adapted to work as a charger in the charging mode.

8. The vehicular work machine according to claim 7, wherein the first motor driver assembly is adapted to control a rate of charging of the energy storage arrangement in dependence of available power from the external power supply and power required by the hydraulic pump assembly.

9. The vehicular work machine according to claim 1, wherein the vehicular work machine is adapted for a first mode of operation where only the first electric motor arrangement propels the hydraulic pump assembly, a second mode of operation where only the second electric motor arrangement propels the hydraulic pump assembly, and a third mode of operation where both the first and second electric motor arrangements propel the hydraulic pump assembly.

10. The vehicular work machine according to claim 9, wherein the third mode of operation comprises at least one of the following sub-modes of operation:

a starting mode, where the second electric motor arrangement is adapted to run the first electric motor arrangement before it is powered from the external electric power source;

a common driving mode, where both the first and second electric motor arrangements are adapted to propel the hydraulic pump assembly.

11. The vehicular work machine according to any one of the previous claims, wherein the vehicular work machine comprises a single-phase battery charger that is connectable to the external electric power source via a charger contactor.

12. The vehicular work machine according to claim 1, wherein the first electric motor arrangement comprises one or more asynchronous electric motors.

13. A method for a vehicular work machine, having an energy storage arrangement, a first electric motor arrangement using one or more electric motors, and a second electric motor arrangement using one or more other electric motors, the one or more electric motors in the first electric motor arrangement and the one or more electric motors in the second electric motor arrangement are adapted to be mechanically connectable or mechanically connected to each other, wherein the method comprises:
  powering the first electric motor arrangement from an external electric power source; and
  powering the second electric motor arrangement from the energy storage arrangement.

14. The method according to claim 13, wherein, in a charging mode of operation, the first electric motor arrangement is used for running the second electric motor arrangement as a generator that is used for charging the energy storage arrangement.

15. The method according to claim 13, wherein, in a first mode of operation, the method comprises only using the first electric motor arrangement for propelling a hydraulic pump assembly used in the vehicular work machine, in a second mode of operation, the method comprises only using the second electric motor arrangement for propelling the hydraulic pump assembly, and in a third mode of operation, using both the first and second electric motor arrangements for propelling the hydraulic pump assembly.

16. The method according to claim 15, wherein the third mode of operation comprises at least one of the following sub-modes of operation:
  a starting mode, where the second electric motor arrangement is used for propelling the first electric motor arrangement before the first electric motor arrangement is powered from the external electric power source;
  a common driving mode, where both the first and second electric motor arrangements are used for propelling the hydraulic pump assembly.

17. A vehicular work machine comprising a first electric motor arrangement comprising one or more electric motors, and a second electric motor arrangement comprising one or more other electric motors, wherein the vehicular work machine further comprises a power connection adapted to be connected to an external electric power source, an energy storage arrangement and a hydraulic pump assembly that is adapted to power hydraulic devices comprised in the vehicular work machine, wherein at least one electric motor in each of the first and second electric motor arrangements is adapted to propel the hydraulic pump assembly, and wherein said one or more electric motors in the first electric motor arrangement are arranged to be electrically powered from the external power supply, and said one or more other electric motors in the second electric motor arrangement are arranged to be electrically powered from the energy storage arrangement; and wherein the vehicular work machine is adapted for
  a first mode of operation where only the first electric motor arrangement propels the hydraulic pump assembly,
  a second mode of operation where only the second electric motor arrangement propels the hydraulic pump assembly, and
  a third mode of operation where both the first and second electric motor arrangements propel the hydraulic pump assembly.

* * * * *